US009145478B2

(12) United States Patent
Costeux et al.

(10) Patent No.: US 9,145,478 B2
(45) Date of Patent: Sep. 29, 2015

(54) CONTINUOUS PROCESS FOR EXTRUDING NANOPOROUS FOAM

(75) Inventors: Stéphane Costeux, Midland, MI (US);
Dennis R. Lantz, Midland, MI (US);
Daniel A. Beaudoin, Midland, MI (US);
Mark A. Barger, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 18 days.

(21) Appl. No.: 14/238,679

(22) PCT Filed: Sep. 14, 2012

(86) PCT No.: PCT/US2012/055262
§ 371 (c)(1),
(2), (4) Date: Feb. 12, 2014

(87) PCT Pub. No.: WO2013/048760
PCT Pub. Date: Apr. 4, 2013

(65) Prior Publication Data
US 2014/0221512 A1    Aug. 7, 2014

Related U.S. Application Data

(60) Provisional application No. 61/540,772, filed on Sep. 29, 2011.

(51) Int. Cl.
*C08J 9/12* (2006.01)
*B29C 44/34* (2006.01)
*B29K 105/04* (2006.01)

(52) U.S. Cl.
CPC .............. *C08J 9/122* (2013.01); *B29C 44/348* (2013.01); *B29C 44/3446* (2013.01);

(Continued)

(58) Field of Classification Search
CPC ............ B29C 44/3446; B29C 44/3442; B29C 44/3449; C08J 9/122
See application file for complete search history.

(56) References Cited

U.S. PATENT DOCUMENTS 5,866,053 A    2/1999    Park et al.
6,063,485 A    5/2000    Smith et al.
(Continued)

FOREIGN PATENT DOCUMENTS

WO    2005092959    10/2005
WO    2011066060    6/2011
(Continued)

OTHER PUBLICATIONS

Costeux, S. "CO2-Blown Nanocellular Foams" Journal of Applied Polymer Science, 2014, app.41293.*
(Continued)

*Primary Examiner* — Mike M. Dollinger
*Assistant Examiner* — Christina Wales
(74) *Attorney, Agent, or Firm* — Steven W. Mork

(57) ABSTRACT

Prepare a polymeric nanofoam using a continuous extrusion process by providing a polymer melt of a polymer composition in an extruder, introducing carbon dioxide to a concentration above the solubility in the polymer melt, cooling the polymer melt without increasing the pressure to achieve conditions where all of the carbon dioxide is soluble in the polymer composition and then extruding the polymer composition and carbon dioxide mixture through an extrusion die so as to experience a pressure drop of at least five MegaPascals at a rate of at least ten MegaPascals per second and allowing the polymer composition to expand into a polymeric nanofoam.

12 Claims, 1 Drawing Sheet

(52) U.S. Cl.
CPC ....... *B29K 2105/041* (2013.01); *C08J 2201/03* (2013.01); *C08J 2203/06* (2013.01); *C08J 2203/08* (2013.01); *C08J 2205/042* (2013.01); *C08J 2325/04* (2013.01); *C08J 2333/12* (2013.01)

(56) References Cited

U.S. PATENT DOCUMENTS

| | | | |
|---|---|---|---|
| 6,383,424 | B1 | 5/2002 | Huang et al. |
| RE37,932 | E | 12/2002 | Baldwin et al. |
| 7,838,108 | B2 | 11/2010 | Thiagarajan et al. |
| 2002/0168509 | A1* | 11/2002 | DeSimone et al. ........ 428/310.5 |
| 2007/0052124 | A1 | 3/2007 | Park et al. |
| 2009/0130420 | A1 | 5/2009 | Thiagarajan et al. |
| 2012/0321873 | A1* | 12/2012 | Costeux et al. ............... 428/220 |

FOREIGN PATENT DOCUMENTS

| | | |
|---|---|---|
| WO | 2011112352 | 9/2011 |
| WO | WO 2011112352 A1 * | 9/2011 |

OTHER PUBLICATIONS

Han, X.; Koelling, K.W.; Tomasko, D.L. "Continuous Microcellular Polystyrene Foam Extrusion with Supercritical CO2" Polymer Engineering and Science; Nov. 2002; 42, 11.*

Otsuka, et l., Nanocellular Foams of PS/PMMA Polymer Blends, Macromol. Mater. Eng. 2008, 293, 78-82.

Ruiz, et al., Low-Density Nanocellular Foams Produced by High-Pressure Carbon Dioxide, Marcomol. Mater. Eng. 2011, 296 (Early view publication DOI: 10.1002/mame.201000346 page Nos. 1-8).

Ruiz, et al., Micro and nano cellular amorphous polymers (PMMA, PS) in supercritical CO2 assisted by nanostructured CO2-philic block copolyemrs—One step foaming process, J. of Supercritical Fluids 58 (2011) 168-176.

Ruiz, et al., Two-step microcellular foaming of amorphous polymers in supercrictial CO2, J. of Supercritical Fluids, 57 (2011) 87-94.

Sato et al, Journal of Supercritical Fluids, 19 (2001) 187-198.

* cited by examiner

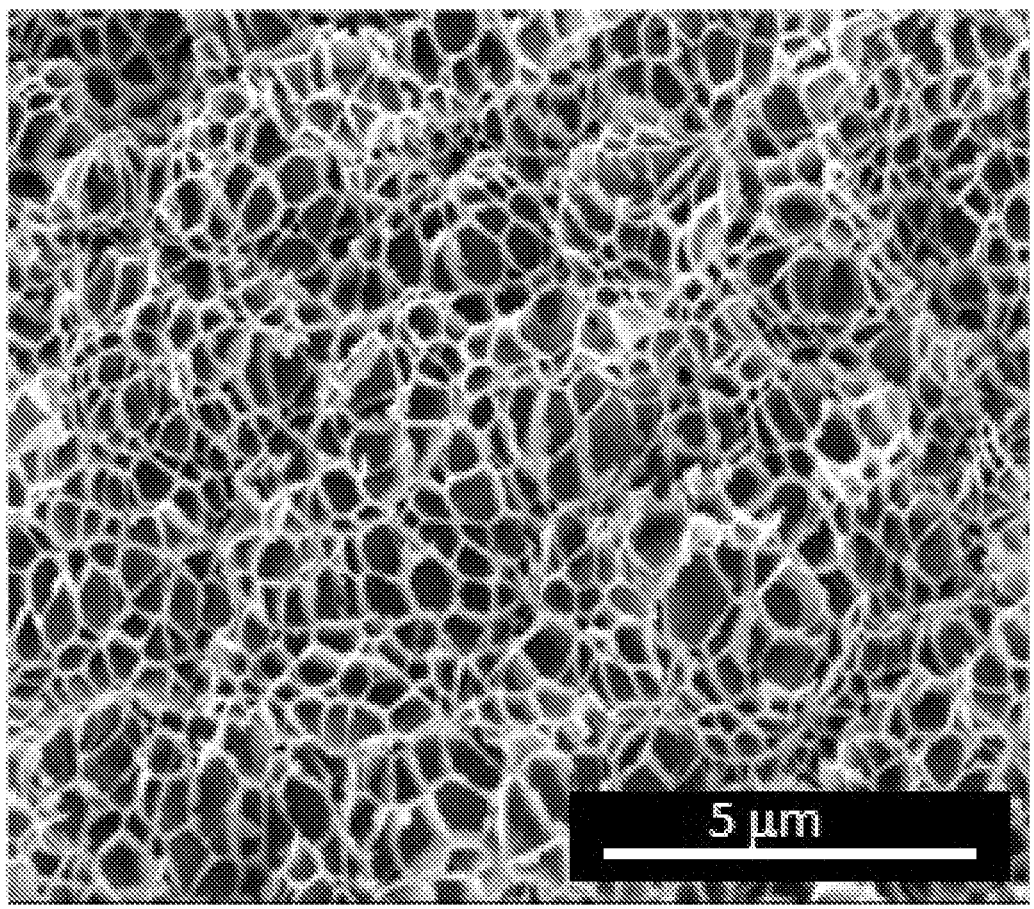

CONTINUOUS PROCESS FOR EXTRUDING NANOPOROUS FOAM

BACKGROUND OF THE INVENTION

1. Field of the Invention

The present invention relates to a continuous process for extruding polymeric foam having an average transverse cell size of less than one micrometer, preferably less than 500 nanometers.

2. Introduction

Increasing energy efficiency is an ever present goal. One large use of energy is in creating and maintaining environments at a particularly desirable temperature by heating and/or cooling. Efficient use of energy while controlling temperature requires minimizing thermal energy transport between the area of controlled temperature and the environment surrounding that area. Therefore, thermal insulating materials are commonly used to isolate temperature controlled areas from other areas that may be at a different temperature. Thermally insulating materials are commonplace in building structures and appliances such as refrigerators and freezers for instance.

Polymeric foam has long been used as a thermal insulating material. Historically, typical thermally insulating polymeric foam comprises a plurality of closed cells having dimensions of 100 micrometer or greater and require presence of gas having low thermal conductivity in the foam cells. While these polymeric foams serve well as thermally insulating materials, there is opportunity to improve the thermally insulating properties of polymeric foam without resorting to low thermal conductivity gases. One characteristic of polymeric foam that controls thermal conductivity through the foam is the cell size. Behavior of gas molecules in foam cells can contribute to thermal conductivity through the polymer foam if the gas molecules are free to move within the cells and collide with the cell walls. Cell size has little influence on the contribution of cell gas to the thermal conductivity through foam when the cell size is between about one micron and about one millimeter. Convection behavior of a gas within a foam cell tends to increase thermal conductivity through the foam when the cell size exceeds about one millimeter. The contribution of cell gas to thermal conductivity through polymeric foam decreases dramatically when the cell size of the foam is reduced below one micrometer. For example, thermal conductivity due to cell gas reduces almost in half upon reducing a foam cell size from one micrometer to 300 nanometers (nm) and reduces by almost $2/3$ upon reducing the cell size from one micrometer to below 100 nm. Therefore, polymeric foam having a nanoporous structure (that is, having an average cell size that is below one micron), especially polymeric foam having an average cell size of 300 nm or less, and most preferably 100 nm or less is desirable as thermal insulation. In particular, it is desirable for the polymeric foam to have such cell size dimensions as measured in a direction of the foam through which thermal conductance occurs (for example, the thickness dimension of a foam board). For extruded foam, for example, this cell size dimension typically corresponds to a dimension in a transverse direction of the foam, which is a direction in a plane perpendicular to the foam's extrusion direction.

It is further desirable for thermally insulating polymeric foam to have a high void volume. Generally, thermal conductivity is higher through the polymer network of a polymeric foam structure than through the cell gas. Therefore, maximizing the amount void space due to cells in foam will generally result in a decrease in thermal conductivity through the foam. This is particularly true for polymeric foam having a nanoporous structure. One way to characterize void volume is by "porosity", which is the ratio of void volume to foam volume. Porosity values of 0.50 or greater are desirable for thermally insulating foam.

Preparation of polymeric foam having a nanoporous structure (that is, "nanofoam") in a commercially viable manner has proven challenging, particularly with a high enough void volume to make it a desirable thermally insulating material. Current processes for preparing thermally insulating polymeric foam are typically continuous extrusion processes. Continuous extrusion processes are desirable because they can produce greater quantities of product in less time than, for example, batch processes. Yet, the technology required for preparing nanofoam has proven challenging to incorporate in a continuous extrusion process at least partially due to the amount and type of blowing agent required to prepare nanofoam. Nanofoam has typically been prepared in batch processes using supercritical carbon dioxide (or a similar blowing agent) under extremely high pressures. Few have achieved a continuous extrusion process for producing nanofoam.

U.S. reissue patent 37,932E describes a process for preparing polymeric foam having cell sizes that can be below 0.1 micrometers that includes use of an extruder to prepare a foamable polymer composition and then extrude that composition into a mold. The "extrusion" process is really a batch process since the extruder is only used to fill a mold with foam rather than extrude a continuous foam article. It would be desirable to have a truly continuous process that extrudes a continuous foam article. U.S. Re37,932E discloses a method of imbibing solid polymer with carbon dioxide and a method of blending supercritical carbon dioxide fluid into a molten polymer material. The molten process involves dissolving the carbon dioxide into the molten polymer to form a homogeneous and uniform fluid/polymer solution and then heating the mixture. Heating reduces the carbon dioxide solubility and initiates nucleation of the carbon dioxide blowing agent. However, heating to initiate nucleation is an energy intensive step that would be desirable to avoid.

U.S. Pat. No. 6,383,424 discloses an extrusion process for preparing polymeric membranes and claims such membranes having a microcellular structure of 0.5 to 15 micrometers. The extrusion process requires mixing carbon dioxide with a polymer melt to achieve near complete dissolution of the carbon dioxide into the melt. The process then requires reducing the temperature and increasing the pressure to push the polymer out through a shaping device. The process requires a means (such as a pump) for increasing pressure on a polymer melt after mixing in blowing agent. The step of increasing pressure adds complexity to the process both by requiring additional equipment (for example, an additional pump) and by requiring heavy duty equipment that can withstand the pressures of the process (the reference identifies the pressure is in the range of up to 1500 bars). It is desirable to be able to prepare nanofoam without requiring an increase in pressure after mixing blowing agent with a polymer melt. It is further desirable to be able to achieve cell sizes below 0.45 microns.

U.S. Pat. No. 5,866,053 discloses a process for producing a continuous stream of supermicrocellular polymers. U.S. Pat. No. 5,866,053 teaches that only a soluble amount of carbon dioxide blowing agent can be added to a polymer melt or undesirably voids in the polymer melt will occur, resulting in hollow cavities in the final product. It is desirable, however, to incorporate into a foamable polymer composition more blowing agent than is soluble in the polymer melt in order to lower foam density while at the same time avoiding undesirable voids in the polymer melt and cavities in the final product.

U.S. Pat. No. 7,838,108 discloses theoretical concepts for making nanofoam that include conceptually how to prepare nanofoam by extrusion methods. U.S. Pat. No. 7,838,108 discloses addition of dry ice (solid carbon dioxide) to a polymer melt in combination with carbon dioxide gas in order to achieve a homogeneous phase in a single phase solution zone of the extruder. Combining dry ice with a polymer melt is a challenging process to do safely due to the volatility of the dry ice and the tremendous temperature difference between the dry ice and the polymer melt. Additionally, as with U.S. Pat. No. 5,866,053, adding only enough carbon dioxide to achieve a homogenous phase in a single phase solution restricts the amount of carbon dioxide that can be added in the process to the solubility limit of the polymer melt, which restricts how low of a density is achievable and nascent cell count in the resulting foam.

While processes for preparing nanofoam using an extruder are known, there remains opportunity to improve and advance the technology of producing nanofoam by continuous extrusion. In particular, it is desirable to be able to have a truly continuous extrusion process that produces a continuous foam article as opposed to a process that extrudes foamable compositions into a mold. Moreover, it is desirable to provide a process that includes mixing into a polymer melt more blowing agent than is soluble in the polymer melt in order to achieve low density foam, but do so without creating undesirably large hollow cavities in the final product. It is further desirable for the process to be free from having to mix dry ice with a polymer melt or increase the temperature of or pressure on the polymer melt after introducing blowing agent and prior to extruding.

BRIEF SUMMARY OF THE INVENTION

The present invention provides a solution to the challenge of preparing nanofoam in a truly continuous extrusion process that incorporates adding to a polymer melt more blowing agent than is soluble in a polymer melt yet incorporating that blowing agent into the polymer prior to expansion without creating undesirable hollow cavities and without having to add dry ice to a polymer melt or increase the temperature of or pressure on the polymer melt after introducing blowing agent and prior to extruding.

The present invention stems from a discovery of how to add to a polymer melt an excess of blowing agent (more than is soluble in the polymer melt) in an extruder and then cause the blowing agent to dissolve into the polymer without increasing pressure in such a way so as to allow expansion into nanofoam without resulting in large voids in the nanofoam.

In a one aspect, the present invention is a continuous extrusion foaming process comprising the following steps: (a) providing a polymer melt in an extruder of an extrusion foaming line, the polymer melt comprising a polymer composition that has a softening temperature and that consists of all of the polymers in the polymer melt; (b) introducing carbon dioxide into the polymer melt within the extrusion foaming line at an initial addition pressure while mixing the polymer melt and carbon dioxide together and while the polymer melt is at an initial addition temperature that is above the softening temperature of the polymer composition to form a polymer/carbon dioxide mixture wherein the total amount of carbon dioxide added to the polymer melt exceeds the amount of carbon dioxide that is soluble in the polymer composition at the initial addition temperature and initial addition pressure and the carbon dioxide is dispersed throughout the polymer composition; (c) cooling the polymer/carbon dioxide mixture to a dissolving temperature that is below the initial addition temperature while keeping the pressure around the polymer/carbon dioxide mixture between the initial addition pressure and a dissolving temperature that is equal to or below the initial addition pressure, wherein all of the carbon dioxide in the polymer/carbon dioxide mixture is soluble in the polymer composition at the dissolving temperature and dissolving pressure; and (d) extruding the polymer/carbon dioxide mixture through an extrusion die into an expansion region having an expansion pressure that is lower than the dissolution pressure such that the polymer/carbon dioxide mixture experiences a pressure drop of at least five MegaPascals at a rate of at least ten MegaPascals per second as it exits the extrusion die and expands into a polymeric foam having an average transverse cell size that is less than one micrometer; wherein the process is free from adding solid carbon dioxide to the polymer and wherein the polymer/carbon dioxide mixture does not experience a pressure greater than the initial addition pressure during the extrusion foaming process.

The process of the present invention is useful for preparing polymeric foam having nanometer sized cells that can be suitable for use as thermally insulating materials, filter media and the like.

BRIEF DESCRIPTION OF THE DRAWINGS

FIG. 1 is a scanning electron micrograph of the foam of Example 4.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to American Society for Testing and Materials; EN refers to European Norm; DIN refers to Deutsches Institut für Normung; and ISO refers to International Organization for Standards.

"Multiple" means two or more. "And/or" means "and, or as an alternative". All ranges include endpoints unless otherwise indicated.

Extruded polymeric foam has three perpendicular directions: an extrusion direction that is parallel to the direction the foam was extruded during manufacture and two mutually perpendicular transverse directions that are both perpendicular to the extrusion dimension. Extruded polymeric foam has a transverse plane that is perpendicular to the extrusion direction and that contains the two transverse directions.

A foam article has three mutually perpendicular directions: length, thickness and width. Length corresponds to the direction with the longest dimension. Thickness corresponds to the direction with the shortest dimension perpendicular to the thickness. Width corresponds to the mutually perpendicular direction to the thickness and width directions. Length, thickness and width directions can all be the same, two can be the same and one different, or all can be different in dimension. For example, a cubic foam article has a thickness, width and length all equal (the longest dimension is equal to the shortest dimension). Generally, the length direction corresponds to the extrusion direction of an extruded foam article and the thickness and width directions correspond to transverse directions of an extruded foam article.

The present invention is a continuous extrusion process for producing polymeric foam. The process is "continuous", which means the process is capable of producing polymeric foam in an uninterrupted flow for as long as ingredients are provided into the process. The polymer composition in the present invention continues to move along the extrusion process line throughout the process. A continuous process is in contrast to batch, and semi-batch, processes that produce individual foam articles in set dimensions by, for example, introducing foamable polymer compositions into a mold and then expanding the foamable polymer composition in the mold.

The process is an "extrusion" process, which means the process includes driving or forcing ingredients through an extruder. The extruder is part of an extrusion foaming line that comprises an extruder, an extrusion die and optionally other components between the extruder and extrusion die such as dynamic mixers, static mixers, coolers, one or more than one additional extruder, even hollow extensions (for example, hollow tube or pipe). The foam extrusion line is a continuous system through which polymer and, for at least a portion of the extrusion line, blowing agent travel. Non-exhaustive examples of suitable extrusion foaming lines include the following, listing components in order:

(a) An extruder, or multiple extruders in series (tandem), with multiple temperature controlled zones and an extrusion die at the end of the extruder (or series of extruders);

(b) An extruder, a dynamic mixer, a cooler that optionally contains static mixers and/or dynamic mixing elements and/or parallel flow elements, an extrusion die; and (c) An extruder, a cooler that optionally contains static mixers and/or dynamic mixing elements and/or parallel flow elements, an extrusion die;

Suitable coolers include sections, such as sections of the extruder, that have coolant flowing around the outside of the extruder, hollow sections that have coolant fluid circulating around the outside of the extruder and/or within tubes located inside the extruder. Suitable static mixers include any stationary element in the flow path of a polymer that forces the polymer to redirect its flow. Generally static mixers have a form of pins or bars extending into a flow path, fins extending into or spiraled along the walls of a flow path to direct polymer flow and fold the polymer into itself during flow, plates with holes through which polymer is forced to flow. Suitable dynamic mixers are moving elements that induce mixing of a polymer flowing through or past the mixer. A rotating screw of an extruder is one form of dynamic mixer. Additional elements inducing shear or extensional deformation, such as pin mixers, chaotic mixers, cavity transfer mixers are further examples of dynamic mixers any one or combination of more than one of which is suitable for use in the present invention. Suitable parallel flow elements include hollow sections that separate polymer flow between multiple channels and later recombine them into a single channel (for example, multiple circular channels or multiple slots with rectangular cross sections). An extrusion die is a housing with an opening or orifice through with the polymer flows to exit the extrusion foam line. The extrusion die can have a slit opening, a round or annular opening, multiple slit openings, multiple round or annular openings or any combination of slit and round or annular openings through which the polymer exits the extrusion foam line.

The process of the present invention includes providing a polymer melt in an extruder of an extrusion line. The polymer melt can consist of a single type of polymer or comprise more than one type of polymer. For avoidance of doubt, the meaning of "polymer" includes both homopolymer and copolymer unless otherwise stated and the meaning of "copolymer" includes both block copolymers and random and alternating copolymers unless otherwise stated. The polymers in the polymer melt can be amorphous, semi-crystalline or a combination of amorphous and semi-crystalline. Desirably, the polymer melt comprises at least one polymer selected from a group consisting of acrylic polymers and alkenyl aromatic polymers. The polymer melt can comprise only acrylic polymers or only alkenyl aromatic polymers. Suitable acrylic polymers include copolymers of methyl methacrylate with polar monomers such as one or more selected from a group consisting of methyl acrylates, ethyl acrylates, butyl acrylates, ethyl methacrylate, butyl methacrylate, acrylic acid, vinyl acetate. Suitable alkenyl aromatic polymers include polystyrene homopolymer and styrenic copolymers such as styrene-acrylonitrile copolymer.

A polymer "melt" refers to a polymer composition that is above the softening temperature of the polymer composition. The polymer composition consists of all of the polymers in the polymer melt. The polymer composition can comprise a single polymer or a combination of more than one polymer. The polymer composition has a softening temperature. The "softening temperature" of a polymer composition refers to the softening temperature of only the polymeric components apart from any additives (for example, blowing agents or other plasticizers). The additives can act as plasticizers that reduce the effective softening temperature of the composition comprising the plasticizer. Such a plasticizing effect is not taken into account when referring to the softening temperature of a polymer composition, which is a property of the polymer composition alone.

The softening temperature (Ts) for a polymer composition containing only semi-crystalline polymers is the melting temperature (Tm) for the polymer composition. The Ts for a polymer composition that only contains one or more than one amorphous polymers is the glass transition temperature (Tg) for the polymer composition. If a polymer composition contains a combination of semi-crystalline polymers and amorphous polymers, Ts is the Ts of the continuous phase polymer composition. If semi-crystalline and amorphous polymer phase are co-continuous then the Ts of the blend is the higher Ts of the two phases.

The melting temperature (Tm) for a semi-crystalline polymer is the temperature half-way through a crystalline-to-melt phase change as determined by differential scanning calorimetry (DSC) upon heating a crystallized polymer at a specific heating rate. Determine Tm for a semi-crystalline polymer according the DSC procedure in ASTM method E794-06. Determine Tm for a combination of polymers and for a filled polymer composition also by DSC under the same test conditions in ASTM method E794-06. Determine Tm using a heating rate of 10 degrees Celsius (° C.) per minute. If the polymer composition only contains miscible polymers and only one crystalline-to-melt phase change is evident in its DSC curve, then Tm for the polymer composition is the temperature half-way through the phase change. If multiple crystalline-to-melt phase changes are evident in a DSC curve due to the presence of immiscible polymers, then Tm for the polymer composition is the Tm of the continuous phase polymer. If more than one polymer is continuous and they are not miscible, then the Tm for the polymer composition is the highest Tm of the continuous phase polymers.

The glass transition temperature (Tg) for a polymer composition is as determined by DSC according to the procedure in ASTM method E1356-03 using a heating rate of 10 degrees Celsius (° C.) per minute. Determine Tg for a combination of polymers (for example, a polymer blend) and for a filled polymer composition also by DSC under the same test conditions in ASTM method E1356-03. If the combination of polymer or filled polymer composition only contains miscible polymers and only one glass transition phase change is evident in the DSC curve, then Tg of the polymer combination or filled polymer composition is the temperature halfway through the phase change. If multiple glass transition phase changes are evident in a DSC curve due to the presence of immiscible amorphous polymers, then Tg for the polymer combination or filled polymer composition is the Tg of the continuous phase polymer. If more than one amorphous polymer is continuous and they are not miscible, then the Tg for the polymer composition or filled polymer composition is the highest Tg of the continuous phase polymers.

The process of the present invention includes introducing carbon dioxide into a polymer melt to form a polymer/carbon dioxide mixture. Carbon dioxide is added in non-solid form, meaning the present process is free from adding solid carbon dioxide ("dry ice") to the polymer composition. Carbon dioxide can be added as a gas, liquid or, preferably, as a supercritical fluid.

Carbon dioxide is added to the polymer melt at an "initial addition pressure" and while the polymer melt is at an "initial addition temperature". The polymer melt is, by definition, at or above the softening temperature (Ts) of the polymer composition comprising the polymer melt. Therefore, the initial addition temperature is equal to or higher than the Ts of the polymer composition in the polymer melt. Desirably, the initial addition temperature is higher than the Ts, preferably 20 degrees Celsius (° C.) or more, more preferably 40° C. or more, more preferably 60° C. or more, and can be 80° C. or more and even 100° C. or more above Ts of the polymer composition. Generally, the initial addition temperature is less than 200° C. above Ts of the polymer composition. Higher temperatures are desirable to achieve a more fluid polymer melt, which facilitates mixing of the carbon dioxide into the polymer melt. Higher temperatures tend to reduce carbon dioxide solubility in the polymer melt, but facilitating mixing of carbon dioxide with the polymer melt is more desirable in the present invention. Desirably, the polymer composition is not heated above the initial addition temperature once carbon dioxide has been added to the polymer composition.

The initial addition pressure is sufficiently high to provide carbon dioxide at a supercritical state into the polymer melt. Generally, the initial addition pressure and initial temperature exceed that necessary to achieve the critical point for carbon dioxide. Typically, the initial addition pressure is 30 MegaPascals (MPa) or more, preferably 40 MPa ore more, more preferably 50 MPa or more and can be 60 MPa or more. At the same time, it is typical for the initial addition pressure to be 100 MPa or less. The polymer/carbon dioxide mixture does not experience a pressure greater than the initial addition pressure during the extrusion foaming process.

Carbon dioxide can be added to the polymer melt at a single location (addition location) along the extrusion foam line or can be added to the polymer composition at multiple addition locations along the extrusion line. For example, all of the carbon dioxide can be added at a single addition location in the extruder, or in or just prior to a dynamic mixer following the extruder. Alternatively, carbon dioxide can be added at multiple addition locations along the extruder or at one or more than one addition location along the extruder in combination with an addition location just prior to a dynamic mixer after the extruder, an addition location in a dynamic mixer following the extruder or in combination with addition locations just prior to and in a dynamic mixer following the extruder. These are just exemplary options for adding carbon dioxide to a polymer melt and the broadest scope of the present invention covers all of these options and more.

If carbon dioxide is added to the polymer composition at multiple addition locations only the first addition location must be at the initial addition pressure. The pressure at addition locations after the first addition location (subsequent addition locations) will be at a pressure equal to or, preferably, lower than the initial addition pressure. The pressure is desirably lower at subsequent addition locations to prevent flow of carbon dioxide backwards away from the die of the extrusion foam line. At no location along the process after the first addition location does the pressure on the polymer/carbon dioxide mixture exceed the initial addition pressure.

Similarly, if carbon dioxide is added to the polymer composition at multiple addition locations then only the first addition location must be at the initial addition temperature. It can be desirable to lower the temperature of the polymer composition relative to the initial addition temperature at subsequent addition locations to increase the solubility of carbon dioxide in the polymer composition. It is within the broadest scope of the present invention for the polymer composition to be at a temperature below the Ts of the polymer composition at one or more than one subsequent addition locations. Due to the plasticizing effect of carbon dioxide on the polymer composition, the polymer composition can actually be at a temperature below its Ts at subsequent addition locations and still be in a softened state. Alternatively, the polymer composition can remain above its Ts throughout addition of all the carbon dioxide.

Desirably, carbon dioxide is added to the polymer melt while mixing the polymer melt in order to ensure rapid distribution of the carbon dioxide into the polymer melt. If carbon dioxide is added at multiple addition locations in an extrusion foam line then it is desirable for mixing to occur at each addition location so carbon dioxide is immediately mixed into the polymer composition.

The total amount of carbon dioxide that is added to the polymer composition (whether it is all added to the polymer composition as a polymer melt or not) is desirably 15 weight-percent (wt %) or more, preferably 20 wt % or more and can be 25 wt % or more, 30 wt % or more and even 35 wt % or more relative to the total weight of polymer composition. Higher concentrations of carbon dioxide are desirable in order to achieve lower density foam and a larger number of nucleation sites. The total concentration of carbon dioxide is desirably 60 wt % or less relative to the total weight of polymer composition to avoid wasting carbon dioxide.

A characteristic of the process of the present invention is that carbon dioxide is present in the polymer/carbon dioxide mixture at a higher concentration than the solubility limit of carbon dioxide in the polymer composition at some point during the addition of carbon dioxide, optionally throughout the addition of carbon dioxide. As such, the total amount of carbon dioxide added to the polymer composition exceeds the carbon dioxide solubility limit of the polymer composition at the initial addition temperature and initial pressure. Regardless of whether carbon dioxide is added at a single addition location or at multiple addition locations, the total amount of carbon dioxide added can exceed the solubility limit in the polymer composition under the pressure and temperature of the polymer/carbon dioxide mixture immediately after all of the carbon dioxide has been added. Alternatively, if the polymer composition cools during addition of carbon dioxide it is also possible for the carbon dioxide solubility limit to exceed the total amount of carbon dioxide added by the time all the carbon dioxide has been added. However, in such a case, it still is true that at some point in the process the amount of carbon dioxide added to the polymer composition exceeds the solubility limit of carbon dioxide into the polymer composition. Preferably, after each addition of carbon dioxide to the polymer composition the total amount of carbon dioxide added to the polymer composition exceeds the solubility of carbon dioxide in the polymer composition after that addition of carbon dioxide.

Determine the solubility limit for carbon dioxide in a polymer composition at a certain temperature and pressure by using a magnetic suspension balance according to the gravimetric method described in Sato et al, *Journal of Supercritical Fluids*, 19 (2001) 187-198.

By adding more carbon dioxide to the polymer composition than is soluble in the polymer composition the current process provides for rapidly adding a large quantity of carbon dioxide to a relatively high temperature polymer composition. As a result, the full amount of carbon dioxide needed to achieve a target low density can quickly be added and efficiently be mixed into the polymer composition. Solubility of carbon dioxide into polymer is inversely related to polymer composition temperature and directly related to pressure. While operating at relatively high polymer composition temperatures, carbon dioxide solubility decreases but the polymer can more easily be mixed with the carbon dioxide than at lower temperatures. Lower pressures are also less desirable from a carbon dioxide solubility perspective, but allow for a simpler process because high pressure equipment is not needed in the present extrusion foam process line. Therefore, introducing carbon dioxide to an extent exceeding the solubility limit of the polymer composition allows the polymer composition to remain at a higher temperature (which facilitates mixing of carbon dioxide into the polymer composition) and at a lower pressure (which allows for use of lower pressure extrusion foam line components and lower pressure pumps) while still introducing sufficient carbon dioxide to expand into a low density polymer foam.

It is desirable in the process of the present invention to mix the carbon dioxide quickly and thoroughly with the polymer composition as the carbon dioxide is added in order to get as homogeneous of a polymer/carbon dioxide mixture as possible as quickly as possible. That is why it is desirable to actively mix the polymer composition as carbon dioxide is added to the polymer composition.

After adding all of the carbon dioxide and mixing it thoroughly into the polymer composition, the next step in the process is to cool the polymer/carbon dioxide mixture to a dissolving temperature that is below the initial addition temperature while keeping the pressure around the polymer/carbon dioxide mixture between the initial addition pressure and a dissolving pressure that is equal to or lower than the initial addition pressure. Desirably, the dissolving temperature and dissolving pressure are selected such that all of the carbon dioxide added to the polymer composition is soluble in the polymer composition at the dissolving temperature and dissolving pressure. After cooling the polymer/carbon dioxide mixture to the dissolving temperature, it is desirable to keep the polymer/carbon dioxide mixture at or near the dissolving temperature for a period of time to facilitate dissolving of the carbon dioxide into the polymer composition. The cooling step, including holding at or approximate to the dissolving temperature can take 10 minutes or longer, preferably 15 minutes or longer, still more preferably 20 minutes or longer in order to maximize how much carbon dioxide dissolves in the polymer composition.

It is desirable for all of the carbon dioxide added to the polymer composition to dissolve into the polymer composition during or after this cooling step. Even more, it is desirable for the polymer/carbon dioxide mixture to be homogeneous by the end of the cooling step in order to facilitate preparation of homogeneous polymeric foam. A homogeneous polymer/carbon dioxide mixture is evidenced by producing polymeric foam having a monomodal transverse cell size distribution. For the sake of determining whether the polymer/carbon dioxide mixture was homogeneous, a "monomodal transverse cell size distribution" means that at least 90% of the number of cells in a 100 cell sample of a cryogenically cross sectioned portion of foam have a cell size as measured in the foam's transverse plane within a factor of 10 of one another.

FIG. 1 provides an illustration of an example of foam having a monomodal transverse cell size distribution. Determine cell size for a cell in the foam's transverse plane by cryogenically fracturing the foam perpendicular to the foams extrusion direction and examining the cross section by microscopy. A cell's size in the transverse plane corresponds to the average dimension of the largest and shortest cell diameter in the transverse plane. For the sake of this determination, "diameter" corresponds to a chord through the cell that contains the centroid of the cell's cross sectional area in the exposed plane.

The dissolving temperature is below the initial addition temperature and desirably is below the Ts of the polymer composition, preferably 10° C. or more, still more preferably 20° C. or more and can be 30° C. or more, 40° C. or more, 50° C. or more, even 60° C. or more below the Ts of the polymer composition.

The dissolving pressure is equal to or less than the initial addition pressure and is desirably 10 MPa or more, preferably 20 MPa or more, more preferably 30 MPa or more and can be 30 MPa or more. At the same time, the dissolving pressure is typically 60 MPa or less and preferably 50 MPa or less.

Generally, the present process is free from active (that is, dynamic) mixing of the polymer/carbon dioxide mixture once all of the carbon dioxide has been added. Active mixing tends to generate heat that competes with efforts to cool the polymer/carbon dioxide mixture. Nonetheless, mixing the polymer/carbon dioxide mixture while cooling can increase cooling efficiency by facilitating heat transfer through the mixture, provided the mixing is not too aggressive. While cooling, the polymer/carbon dioxide mixture can travel through passive (static) mixers that relatively gently mix the mixture. For example, the polymer/carbon dioxide mixture can travel through static mixer elements such as those that that fold the mixture on itself or that divide the mixture into distinct flow streams and then recombine the flow streams (for example, a plate with multiple holes through which the polymer/carbon dioxide flows). Alternatively, the polymer/carbon dioxide mixture can be cooled without any further mixing. Yet as another alternative, the polymer/carbon dioxide mixture can be cooled while traveling through an active (dynamic) mixer in the form of an extruder, such as a second extruder tandem to the extruder in which the polymer melt traveled. Still more, the polymer/carbon dioxide mixture can be cooled as it travels through sections of the foam extrusion line that comprise any combination of active, static and sections free from mixers for at least part of the cooling step.

After cooling the polymer/carbon dioxide mixture the polymer/carbon dioxide mixture is extruded through an extrusion die. The polymer/carbon dioxide mixture is extruded through a die into an expansion region having an expansion pressure that is lower than the dissolving pressure such that the polymer/carbon dioxide mixture experiences a pressure drop at a rate of at least ten megaPascals per second.

It is typical for the expansion region to be the environment outside and around the extrusion foam line, particularly the extrusion die. The expansion pressure is typically at or close to atmospheric pressure (101 kiloPascals), but can be any pressure provided it is below the dissolving pressure and the necessary pressure drop rate can be achieved. It is desirable for the pressure drop between the dissolving pressure prior to the extrusion die and the expansion pressure outside of the die to be at least 5 MPa, preferably at least 10 MPa, even more preferably 20 MPa or more, still more preferably 25 MPa or more. It is also desirable for the pressure drop between the dissolving pressure prior to the extrusion die and the expansion pressure outside of the die to occur in one second or less, preferably in 0.5 seconds or less, more preferably in 0.2 seconds or less and yet more preferably within 0.1 seconds or less. Generally, there is no known reason to accomplish the pressure drop over a period of time longer than a certain value. The pressure drop is typically accomplished as quickly as possible. It is obvious to one of skill in the art that the pressure drop must occur over a finite period of time so the time period for the pressure drop must be greater than zero seconds. Typically, the pressure drop occurs over one millisecond or longer at the same time it occurs within any of the upper limits for the time already stated.

The extrusion die can have one or more than one orifice through which the polymer/carbon dioxide mixture is extruded. A multiple orifice die can be designed to produce multiple independent foam articles or cause the multiple extrudates to contact one another and fuse together to form a single foam article comprising multiple foam "strands". The process can include coextruding the polymer/carbon dioxide mixture with other materials that form a layer or layers or even a coating around the foam that forms from the polymer/carbon dioxide mixture.

Upon extruding through the extrusion die, the polymer/carbon dioxide mixture expands into continuous polymeric foam. The continuous polymeric foam has an average cell size in the transverse plane (that is, "average transverse cell size") that is less than one micrometer, preferably 500 nanometers or less, still more preferably 300 nanometers or less and even more preferably 100 nanometers or less. Determine average transverse cell size according to the following method: (a) cryofracture (fracture after conditioning to liquid nitrogen temperature) a sample of polymeric foam perpendicular to its extrusion direction to expose a cross section of a polymeric foam along the transverse plane of the foam sample; (b) examine a ten micron by ten micron area of the cross section by scanning electron microscopy (SEM) and produce an image similar to FIG. 1, showing discrete cells separated by cell walls; (c) measure the cell size of 20-50 cells within that portion of the cross sectional area, where cell size corresponds to the average of the longest and shortest cell diameter ("diameter" refers to a chord containing the centroid of the of the cell's void space on the exposed surface) for a cell; (d) repeat step (c) on four to ten additional portions of the same cross sectional area of the polymeric foam; (e) determine the average of all the measured diameters and use that as the average transverse cell size for the polymeric foam article. This process should include measuring the size of several hundred cells in the polymeric foam.

Additionally, or alternatively, it is desirable for optimal thermal insulation properties for cell larger than one micron in the transverse plane to occupy 20 percent or less, preferably 10 percent or less and most preferably 5 percent or less of the total area of a cross section of the foam along the foam's transverse plane while the average transverse cell size is 500 nm or less. Measure the percent of cell larger than one micron (that is, microcells) in the transverse plane relative to the total foam cross sectional area in the transverse plane by: (a) examining a cryogenically fractured cross section of polymeric foam article containing the transverse plane by scanning electron microscopy (SEM); (b) examining a representative portion of the cross section at a magnification that makes several microcells visible if more than one are present in the representative portion; (c) analyze the representative portion with the help of the free software "ImageJ" available from the National Institutes of Health (see, for example, http://rsb.info.NIH.gov/ij) by using the "Analyze' function in the software to first set the scale of an image of the cross section and then draw a freehand line around the edges of a microcell and select "Measure" and repeat for each microcell in the image; (d) sum the area of all cells whose area is larger than 0.785 square microns (that is, having an area larger or equal to a one micron diameter circle); (e) divide the sum of the areas by the area of the image and multiply by 100 to obtain the percentage of microcells the total area of the cross sectional of the foam.

The polymeric foam can have an anisotropic cell size. Hence, the cells in the polymeric foam can have a cell size aspect ratio (or simply "aspect ratio") that is one, less than one, or more than one. It is particularly desirable for the foam to have an aspect ratio that is more than one, preferably two or more, even three or more. It is generally the case that the aspect ratio is ten or smaller. Determine aspect ratio by dividing the foam's average cell size in the extrusion direction by the foam's average transverse cell size. Determine a foam's average cell size in the extrusion direction in a similar manner as the average transverse cell size except cryofracture the foam to expose a cross section containing the extrusion direction and use as the diameter for each cell a diameter that is along the extrusion direction of the foam.

Unlike batch foam processes, an extrusion process is particularly well suited for preparing polymeric foam having cells that are elongated in the extrusion direction because the extrusion rate can be controlled (for instance with pullers to enhance the foam translation in the extrusion direction) to enhance or diminish the aspect ratio of the cell sizes.

The polymeric foam desirably has a density of 0.5 grams per cubic centimeter ($g/cm^3$) or less, preferably 0.2 $g/cm^3$ or less, still more preferably 0.15 $g/cm^3$ or less, even more preferably 0.13 $g/cm^3$ or less, and yet more preferably 0.10 $g/cm^3$ or less and most preferably 0.06 $g/cm^3$ or less. Determine density according to ASTM method D-1622-03.

The continuous polymeric foam also has a porosity of 0.50 (or 50%) or more, preferably 0.75 (or 75%) or more, still more preferably 0.85 (or 85%) or more. Determine porosity of foam by first identifying the density (p) of material in the foam (that is, the polymer in combination with any additives) and the density of the foam article ($\rho_f$). Then determine the porosity of the foam (p) using the following equation:

$$p = [1-(\rho_f)/(\rho)]$$

Porosity can also be presented as a porosity percent as determined by the following equation:

$$p\% = p \times 100\%$$

The process of the present invention is useful for preparing continuous polymeric nanofoam that can either have isotropic cell sizes or anisotropic cell sizes while at the same time having any selection of foam properties as described above including average transverse cell size and porosity.

The polymeric nanofoam can have either an open cell structure (that is, possess a 30% or higher open cell content) or a closed cell structure (that is, possess less than 30 percent or less open cell content). Determine open cell content according to ASTM method D6226-05.

The polymer/$CO_2$ mixture can contain additives, or can be free of additives. For example, the polymer/carbon dioxide mixture can contain nucleating additives such as inorganic particles, organic particles, or a combination of organic and inorganic particles. Surprisingly, the process of the present invention is suitable for preparing nanofoam even when the polymer/carbon dioxide mixture is free of inorganic particles, free of organic particles, or free of any nucleating additives. Other additives that the polymer melt can either comprise or be free of individually or in any combination include inorganic plasticizers, organic plasticizers, blowing agent compatibilizers, infrared attenuating agents, flame retardants, antioxidants, pigments and extrusion processing aids such as lubricants. Additives can be introduced at any point during the process or before the process, but are typically added prior to cooling the polymer/carbon dioxide mixture to the dissolving temperature.

The process can include introducing into the polymer melt co-blowing agents in addition to carbon dioxide. Co-blowing agents can be added as a mix with carbon dioxide or as separate feeds in addition to carbon dioxide. Suitable co-blowing agents include argon, nitrogen, saturated and unsaturated fluorocarbons and hydrofluorocarbons, as well as hydrocarbons and water. The concentration of co-blowing agents is typically can be up to 10 wt % of the polymer composition weight and, if present are generally at a concentration of 0.1 wt % or more of the polymer composition weight.

The process of the present invention can further include addition steps besides those described prior. For instance, the process can include forming the expanding (or even expanded) polymer foam after extrusion through the die in order to define foam shape and dimensions as it is extruded. The process can also include a secondary expansion step wherein polymeric foam formed after the polymer/carbon dioxide is extruded from the die is subjected to further treatment to induce additional expansion, typically by softening the polymer in the polymeric foam thereby allowing it to expand under gas pressure in the cells of the polymeric foam. Additional treatments include, for example, exposure to heat, steam, and/or radiation. The process may also comprise a step wherein the extruded foam is cut into articles such as boards, strands, or even pellets. A process of the present invention can include any one of these additional steps or any combination of these additional steps.

The following examples serve to illustrate embodiments of the present invention.

EXAMPLES

Prepare a polymer melt in an extruder by feeding polymethylmethacrylate (PMMA) into a single screw extruder equipped with a 2.54 centimeter screw at a rate of 1.1 kilograms per hour. The PMMA is a random copolymer of methylmethacrylate with 9 wt % (based on PMMA weight) ethylacrylate (commercially available as VS 100 from Arkema). The PMMA has a softening temperature of 96° C. Dry the PMMA prior to feeding into the extruder. For Example 4, feed with the PMMA a 2.5 wt % (relative to PMMA weight) loading of nucleator concentrate. The nucleator concentrate is obtained by compounding silica nanoparticles (Aerosil 300 with ground PMMA powder in a 1:9 mass ratio). The resulting nucleator concentration in Example 4 is 0.25 wt % relative to PMMA.

Table 1 provides specific values and characteristics for the Examples while the following is a general description of the process for the examples. Heat the polymer in the extruder to form a polymer melt at an initial addition temperature. Introduce carbon dioxide into the polymer melt at the initial addition temperature and at an initial addition pressure to form a polymer/carbon dioxide mixture. Mix the polymer/carbon dioxide mixture together for approximately six minutes within the extruder.

While still in the extruder, cool the polymer/carbon dioxide mixture over a period of 30 minutes to a dissolving temperature while achieving a dissolving pressure as indicated in Table 1. At the dissolving temperature and dissolving pressure all of the carbon dioxide is soluble in the PMMA for each example.

Extrude the polymer/carbon dioxide mixture through an extrusion die comprising a zone with a low pressure drop, a convergent section and a narrow parallel channel (that is, a die land). The extrusion die has a rectangular die opening (outlet) that has dimensions of three (3) millimeters by one (1) millimeter. As the polymer/carbon dioxide mixture proceeds through the convergent section it experiences a pressure drop of approximately 30 MPa in approximately 0.8 seconds. Extrusion occurs into ambient pressure and temperature (approximately 101 kiloPascals pressure and 22° C.).

Upon exiting the die the polymer/carbon dioxide mixture expands into a polymeric foam having properties as described in Table 1. The cell size aspect ratio for Example 3 is 2.7.

Each of Examples 1-4 illustrate examples of the present invention. The polymer melt in Examples 1-3 are free of nucleating additives (organic and inorganic). The polymeric foam resulting from each of Examples 1-4 are nanofoam. Example 4 illustrates an example of a highly monodisperse nanofoam that is essentially free of cells larger than one micron. FIG. 1 is a scanning electron micrograph image of Example 4 to illustrate the uniformity of the cell structure of the foam of Example 4.

TABLE 1

|  | Ex 1 | Ex 2 | Ex 3 | Ex 4 |
|---|---|---|---|---|
| Silicon dioxide nucleator (wt % relative to PMMA weight) | 0 | 0 | 0 | 0.25 |
| Initial Addition Temperature (° C.) | 172 | 174 | 174 | 171 |
| Initial Addition Pressure (MPa) | 46 | 46 | 56 | 56 |
| Total Carbon Dioxide added (wt % relative to PMMA weight) | 30 | 30 | 25 | 25 |
| Approximate Carbon Dioxide Solubility limit in PMMA at initial addition temperature and pressure (wt % relative to PMMA weight) | 13 | 13 | 15 | 15 |
| Dissolving Temperature (° C.) | 41 | 40 | 39 | 38 |
| Dissolving Pressure (MPa) | 35 | 35 | 41 | 39 |
| Approximate Carbon Dioxide Solubility limit in PMMA at dissolving temperature and pressure (wt % relative to PMMA weight) | 32 | 32 | 33 | 33 |
| Average transverse cell size (nm) | 360 | 310 | 410 | 390 |
| Foam density (g/cc) | 0.32 | 0.34 | 0.36 | 0.36 |
| Foam porosity % | 73.1 | 71.4 | 69.4 | 69.2 |
| Area % cells > 1 micron | 3 | 10 | 4 | <0.1 |

The invention claimed is:

1. A continuous extrusion foaming process comprising the following steps:
   (a) providing a polymer melt in an extruder of an extrusion foaming line, the polymer melt comprising a polymer composition that has a softening temperature and that consists of all of the polymers in the polymer melt;

(b) introducing carbon dioxide into the polymer melt within the extrusion foaming line at an initial addition pressure while mixing the polymer melt and carbon dioxide together and while the polymer melt is at an initial addition temperature that is at least 20 degrees Celsius above the softening temperature of the polymer composition to form a polymer/carbon dioxide mixture wherein the total amount of carbon dioxide added to the polymer melt exceeds the amount of carbon dioxide that is soluble in the polymer composition at the initial addition temperature and initial addition pressure and the carbon dioxide is dispersed throughout the polymer composition;

(c) cooling the polymer/carbon dioxide mixture to a dissolving temperature that is below the initial addition temperature while keeping the pressure around the polymer/carbon dioxide mixture between the initial addition pressure and a dissolving pressure that is equal to or below the initial addition pressure, wherein all of the carbon dioxide in the polymer/carbon dioxide mixture is soluble in the polymer composition at the dissolving temperature and dissolving pressure; and (d) extruding the polymer/carbon dioxide mixture through an extrusion die into an expansion region having an expansion pressure that is lower than the dissolving pressure such that the polymer/carbon dioxide mixture experiences a pressure drop of at least five MegaPascals at a rate of at least ten MegaPascals per second as it exits the extrusion die and expands into a polymeric foam having an average transverse cell size that is less than one micrometer;

wherein the process is free from adding solid carbon dioxide to the polymer and wherein the polymer/carbon dioxide mixture does not experience a pressure greater than the initial addition pressure during the extrusion foaming process.

2. The process of claim 1, wherein carbon dioxide is added to the polymer composition at more than one location within the extrusion foaming line and wherein carbon dioxide is first added to the polymer melt at an initial addition pressure and subsequent additions of carbon dioxide to the polymer composition occur at a pressure at or below the initial addition pressure and at or above the dissolving pressure.

3. The process of claim 2, wherein the temperature of the polymer composition at the first addition location of carbon dioxide is at the initial addition temperature and below the initial addition temperature during subsequent additions of carbon dioxide.

4. The process of claim 3, wherein the temperature of the polymer composition during at least one addition of carbon dioxide is below the softening temperature of the polymer composition.

5. The process of claim 1, wherein prior to step (c) the amount of carbon dioxide added to the polymer composition immediately after each addition of carbon dioxide exceeds the solubility of carbon dioxide in the polymer composition immediately after that addition of carbon dioxide.

6. The process of claim 1, wherein the polymer composition comprises one or more polymer selected from acrylic polymers and alkenyl aromatic polymers.

7. The process of claim 1, wherein the total amount of carbon dioxide in the polymer/carbon dioxide mixture is at least 20 weight-percent based on total polymer composition weight.

8. The process of claim 1, wherein the dissolving temperature is at least 20° C. below the softening temperature of the polymer composition.

9. The process of claim 1, wherein the polymer/carbon dioxide mixture travels through static mixing elements during at least a part of step (c).

10. The process of claim 1, wherein the polymer/carbon dioxide mixture is homogeneous by the end of step (c) as is evidenced by the formation of a polymeric foam having a monomodal transverse cell size distribution.

11. The process of claim 1, wherein the polymer expands into a polymeric foam having an average transverse cell size that is 500 nanometers or less.

12. The process of claim 1, further comprising a secondary expansion step after step (d) during which time the polymeric foam from step (d) is exposed to heat, steam, and/or radiation so as to soften the polymer of the foam thereby allowing it to further expand under pressure of gas in the cells of the polymeric foam.

* * * * *